Figure 1:
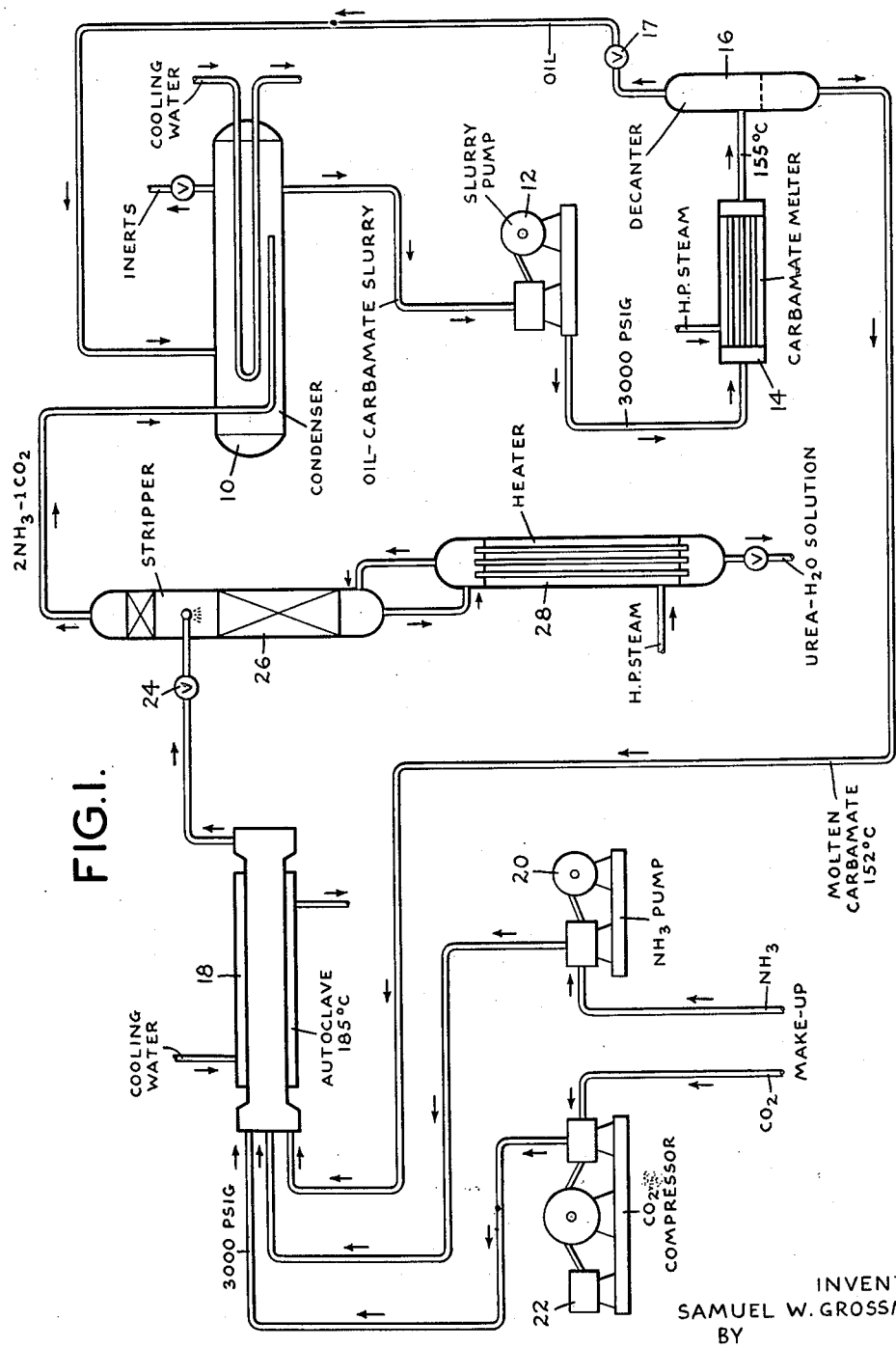

Jan. 8, 1963  S. W. GROSSMANN  3,072,721
PRODUCTION OF UREA FROM AMMONIA AND CO$_2$
Filed Feb. 3, 1959  2 Sheets-Sheet 1

INVENTOR
SAMUEL W. GROSSMANN
BY
*F. Kumpf*
ATTORNEY

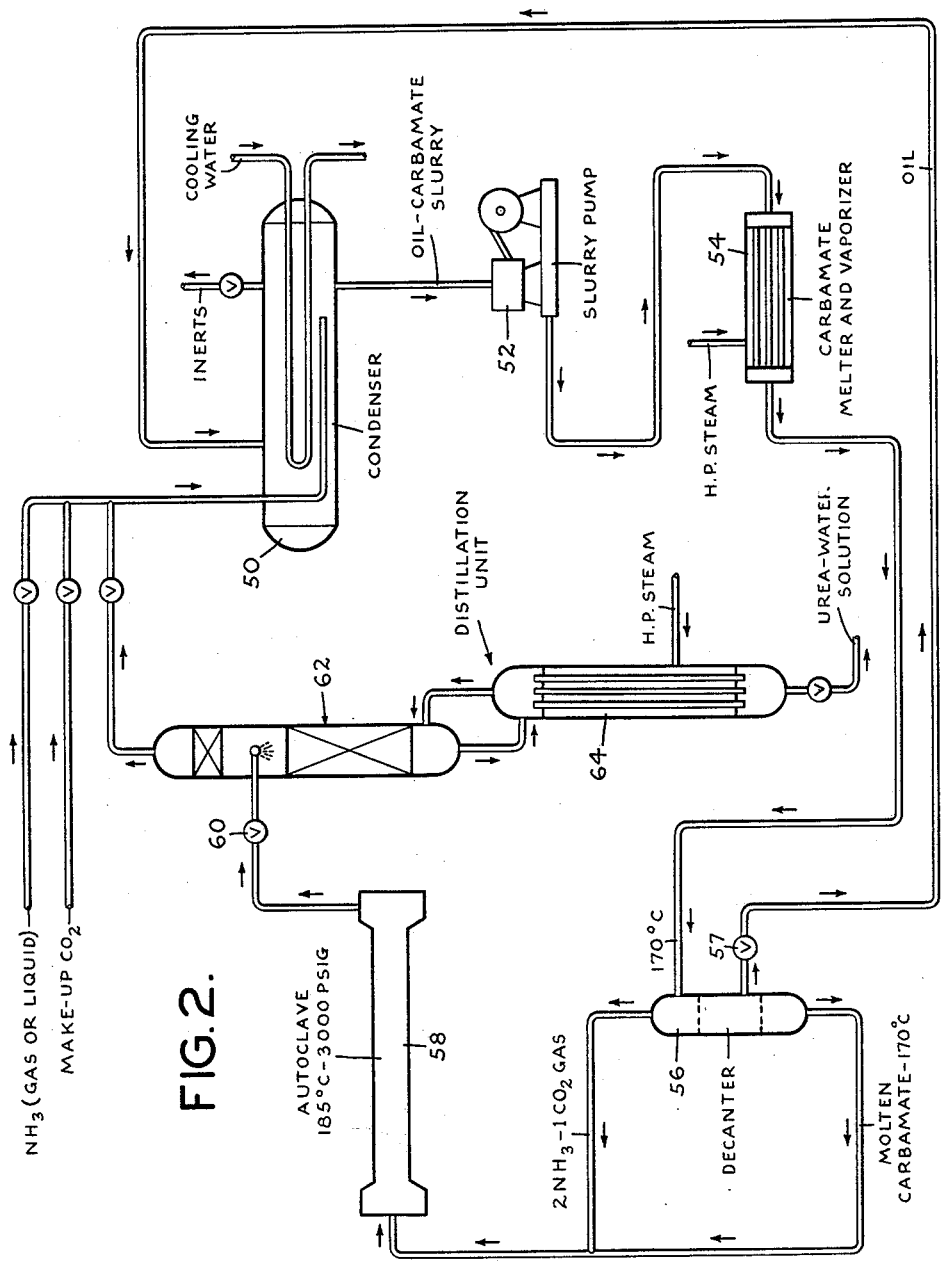

United States Patent Office 3,072,721
Patented Jan. 8, 1963

3,072,721
PRODUCTION OF UREA FROM AMMONIA
AND $CO_2$
Samuel W. Grossmann, Petersburg, Va., assignor to Allied Chemical Corporation, New York, N.Y., a corporation of New York
Filed Feb. 3, 1959, Ser. No. 790,967
8 Claims. (Cl. 260—555)

This invention relates to a process for the preparation of urea.

It is well known in the prior art that urea can be obtained synthetically by heating under pressure ammonium carbamate that has been obtained by the reaction of carbon dioxide and ammonia. Since only a fraction of the carbamate is converted into urea, it has become customary in some processes of the prior art to return the unconverted carbon dioxide and ammonia to the process in the form of a carbamate-oil slurry. This has been accomplished by introducing these gases into a mineral oil and forming a suspension of ammonium carbamate therein which is thereupon injected into the synthesis autoclave. The suspension of carbamate can be prepared either in the presence of fresh make-up ammonia and carbon dioxide or with the residual gases alone, in which case the fresh gases may be injected directly into the synthesis autoclave along with the carbamate slurry.

A process of this type is described in the British Patent 488,404. In the process therein described an oil suspension of ammonium carbamate is prepared by passing the residual carbon dioxide and ammonia derived from a preceding operation for the formation of urea into a mineral oil contained in a vessel which is under low pressure. No fresh carbon dioxide or ammonia are added at this point in the process. The carbamate paste thus prepared is injected into the high pressure synthesis autoclave wherein it is heated to a high temperature in the presence of fresh carbon dioxide and ammonia to bring about the formation of urea. The reaction mixture extracted from the autoclave is released at a lower pressure and delivered to a fractionating column wherein the dissociation of the residual carbamate into carbon dioxide and ammonia is carried out and the urea is separated therefrom. The carbon dioxide and ammonia are taken out overhead while the residual oil and the urea formed in the reaction in the autoclave are removed at the bottom. The oil is then recycled. It has been proposed to modify this process by injecting a hydrocarbon oil, or any inert viscous hydrocarbon liquid which does not contain carbamate in suspension, into the autoclave in which the urea is formed. This process is described in U.S.P. 2,498,538.

In processes of the prior art wherein oil slurries are used, it has been customary to introduce the oil into the autoclave in which the urea is formed. This makes it necessary to separate the oil from the urea solution which is a troublesome step. Furthermore it makes it difficult to obtain a product therefrom which is not contaminated with oil. In addition a large fraction of the volume of the autoclave, which must be made of an expensive material in order to withstand the highly corrosive conditions, is occupied by the oil and is thus ineffective for urea formation.

It is an object of this invention to provide a process which utilizes the convenient and economical recovery of unreacted ammonia and carbon dioxide as a carbamate-oil slurry, but which makes use of a novel modification which avoids the disadvantages attending passing oil into the autoclave in which the urea product is formed. Moreover, the process avoids recycle of urea or water to the autoclave and gains increased yields in comparison with methods involving such a step. A still further object is utilization of the urea autoclave at optimum efficiency thereby minimizing cost of this apparatus per unit of production capacity.

It has been found that these objects and other advantages incidental thereto can be attained by forming an essentially urea-free carbamate-oil slurry at relatively low pressure conditions, subsequently heating and separating the slurry into its components at higher pressure, and feeding the essentially oil-free carbamate to the autoclave. The oil may be recycled for further preparation of slurry.

It has been found that the process of this invention provides a convenient and economical means of recycling the unconverted ammonia and carbon dioxide always present in urea synthesis liquor due to equilibrium limitations on conversion. By the use of this process little or no water, which would decrease conversion, is recycled to the autoclave. The process is quite simple and lends itself to many modifications. Basically, the essential steps of the process may be described as the formation of the slurry at a relatively low temperature with the pressure at least at the dissociation pressure of the carbamate, followed by heating the slurry at the synthesis pressure and a temperature of above 152° C. Under these conditions the carbamate melts and forms a plurality of phases which can readily be separated. The oil phase is returned directly to the mixing chamber without going through the autoclave in which the urea is synthesized while the molten carbamate is fed to the autoclave.

In the drawings which diagrammatically illustrate preferred modifications of the process of this invention, FIGURE 1 illustrates a process in which the unconverted ammonia and carbon dioxide separated from the product urea solution are admixed with an inert viscous liquid to form a slurry of ammonium carbamate. In this modification of the process the make-up ammonia and carbon dioxide are compressed and fed directly into the autoclave along with the molten carbamate recovered from the oil slurry.

FIGURE 2 illustrates an alternative process in which make-up ammonia and carbon dioxide are brought into the system and admixed with the unrecovered ammonia and carbon dioxide as it is introduced into the mixing vessel where the oil-carbamate slurry is being formed. This arrangement eliminates the need for separate ammonia and carbon dioxide compressors.

In the modification of the process depicted in FIGURE 1 of the drawings, the unconverted $CO_2$ and ammonia are fed to condenser 10 wherein the gas mixture is cooled in contact with an inert liquid such as oil to form a slurry of ammonium carbamate. This step can be conveniently carried out at a temperature of 15° C. to 80° C. at a pressure at least at the dissociation pressure of the carbamate which is about 47 p.s.i.g. at 80° C. The oil used is usually a hydrocarbon oil of relatively low volatility, for example, light motor oil or a decolorized oil ("Nujol"). The proportion of carbamate to oil is not critical. A preferred range of proportions is about 20 to 50% by weight of carbamate. The slurry formed in the condenser is then pumped to synthesis pressure of about 3000 p.s.i.g. by means of slurry pump 12 and heated to above 152° C. in the carbamate melter 14 by high pressure steam to melt the carbamate. Under these temperature and pressure conditions the oil and carbamate form two liquid phases which are then fed to a decanter 16 from which the molten carbamate is fed to the urea autoclave 18 to which make-up ammonia and carbon dioxide for the synthesis of urea are also fed. The oil which is taken from the decanter 16 is reduced in pressure at valve 17 and returned to condenser 10 for further preparation of slurry. The heat of reaction of the fresh ammonia and carbon dioxide fed to the autoclave 18 by means of the ammonia pump 20 and $CO_2$ compressor 22 is in excess of that required for the endothermic heat of formation of urea from carbamate. Autoclave 18 is cooled by circulation of cooling water to maintain the reaction within the autoclave at a temperature of about 185° C. and a pressure of 3000 p.s.i.g. The effluent from the urea autoclave at a temperature of about 170–200° C. and a pressure of 3000 p.s.i.g passes through the pressure reduction valve 24 where its pressure is reduced to between 5 lbs. and 100 lbs. p.s.i.g. It then passes to a stripper 26, provided with a heater 28, wherein the unconverted $CO_2$ and $NH_3$ are separated as a gas from the product urea solution. The urea-water solution is removed at the bottom, while the unconverted gas is passed overhead to the condenser 10.

In the modified process illustrated in FIGURE 2 of the drawings the make-up ammonia and carbon dioxide, as well as recycled gases are reacted at relatively low pressure and a temperature of about 15° to 80° C. in the condenser 50 to form a slurry of carbamate in oil which is then pumped to synthesis pressure about 3000 p.s.i.g. by a slurry pump 52 and fed to the carbamate melter and vaporizer 54 wherein it is heated, reaction products being led to a decanter 56 at a temperature of about 170° C. wherein the products are separated into three phases, the gaseous phase, consisting of ammonia and carbon dioxide gas, being taken off from the top, the middle phase, the oil, being removed from the middle, reduced in pressure and fed back to condenser 50 for further preparation of slurry and the molten carbamate removed from the bottom of the decanter 56 at a temperature of about 170° C. and fed to the autoclave along with the gaseous ammonia and carbon dioxide gas taken from the top of the decanter. The molten carbamate and the gases are then reacted in the autoclave 58 to form urea with the products being taken out through the pressure reduction valve 60 and fed to the stripper 62 provided with heater 64. The unconverted ammonia and carbon dioxide are therein separated from the urea-water solution and fed to the condenser for further preparation of slurry while the urea-water solution is removed from the bottom.

Since the make-up ammonia and carbon dioxide are fed directly to the low pressure condenser, rather than the high pressure autoclave, as illustrated in the prior modification of this process shown in FIGURE 1, it is not necessary to provide a separate $CO_2$ compressor and ammonia pump. However, when operating in accordance with this modification of the process additional heat must be supplied to the autoclave. This heat can be supplied, at least in part, by reaction of the gaseous ammonia and carbon dioxide fed to the autoclaves from the decanter.

As can readily be seen the process of this invention has many features which make it more attractive than the prior art processes in which carbamate-oil slurry is used. When using this process the oil is removed from the reactants prior to their introduction into the synthesis chamber and consequently purification of the urea is simplified. In addition, by eliminating the oil from the reactants passing thru the reaction vessel, thus reducing the volume of material passing therethru, it becomes possible to get the most effective and efficient use out of this expensive piece of apparatus.

Although certain preferred embodiments of the invention have been disclosed for purpose of illustration, it will be evident that various changes and modifications may be made therein without departing from the scope and spirit of the invention.

I claim:

1. In the process of preparing urea from ammonia and carbon dioxide wherein ammonia and carbon dioxide are absorbed in an inert oil to form a carbamate slurry the steps comprising absorbing ammonia and carbon dioxide in an inert oil substantially urea free, reacting said ammonia and carbon dioxide therein at a pressure between one and eight atmospheres and a temperature of about 15° to 30° C. to form a carbamate slurry, subjecting said slurry to increased temperature and pressure to form a carbamate melt and an oil phase, separating the phases from one another and introducing the substantially oil free molten carbamate into a reaction vessel wherein urea is synthesized at temperature between 170° C. and 200° C. and pressures between 120 and 250 atmospheres.

2. In the process of preparing urea wherein ammonia and carbon dioxide are absorbed in an inert oil to form a carbamate slurry, the steps comprising raising the temperature and pressure of the carbamate slurry to values at which molten carbamate is formed; separating the molten carbamate from the inert oil with which it is mixed and then pyrolizing the carbamate thus separated to form urea.

3. The process of claim 2 wherein the temperature of the carbamate slurry is raised to about 150° C. and the pressure is raised to about between 120 to 250 atmospheres.

4. The process of claim 2 wherein the molten carbamate is introduced into a reaction vessel wherein urea is synthesized at temperature between 170° to 200° C. and pressure between 120 to 250 atmospheres.

5. In the process of preparing urea wherein ammonia and carbon dioxide are absorbed in an inert oil to form carbamate slurry, the steps comprising separating unconverted carbon dioxide and ammonia as a gas from a product urea-water solution, feeding said unconverted ammonia and $CO_2$ into a substantially urea-free inert oil, reacting the reclaimed unconverted ammonia and carbon dioxide in the presence of said inert oil at a pressure between one and eight atmospheres and a temperature of about 15° to 80° C. to form a carbamate slurry, compressing said slurry to synthesis pressure, heating said compressed slurry to a temperature above 152° C. to form a carbamate melt and an oil phase, separating the phases from one another and introducing the substantially oil free molten carbamate into a reaction vessel wherein urea is synthesized.

6. The process of claim 2, wherein the temperature of the carbamate slurry is raised to above 152° C. and the pressure is raised to about 3000 p.s.i.g.

7. The process of claim 2, wherein the temperature of the carbamate slurry is raised to above 152° C. and the pressure is raised to a pressure between about 120 and 250 atmospheres to form a poly-phase system including a carbamate melt, an oil phase, and a gaseous mixture of ammonia and carbon dioxide, separating the phases from one another and introducing the substantially oil-free molten carbamate into a reaction vessel wherein urea is synthesized.

8. The process of claim 4, wherein compressed fresh make-up ammonia and $CO_2$ is introduced into the reaction vessel along with the molten carbamate.

References Cited in the file of this patent

UNITED STATES PATENTS

| | | |
|---|---|---|
| 1,898,093 | Miller | Feb. 21, 1933 |
| 1,945,314 | Hofsasz | Jan. 30, 1934 |
| 2,498,538 | Frejacques | Feb. 21, 1950 |
| 2,777,877 | Fauser | Jan. 15, 1957 |
| 2,811,553 | Kamlet | Oct. 29, 1957 |
| 2,848,493 | Dewling | Aug. 19, 1958 |

FOREIGN PATENTS

| | | |
|---|---|---|
| 488,404 | Great Britain | July 6, 1938 |

OTHER REFERENCES

Frejacques: Chimie et Industrie, vol. 60, pages 22–35 (1948).

Rooseboom: Chem. Eng., vol. 58, No. 3 (1951), pages 111–4.